United States Patent

Kalfaian

[15] 3,670,107

[45] June 13, 1972

[54] WORD AND LETTER SPACING ARRANGEMENT FOR HUMAN-SPEECH TYPEWRITERS

[72] Inventor: Meguer V. Kalfaian, 962 Hyperion Avenue, Los Angeles, Calif. 90029

[22] Filed: Dec. 14, 1970

[21] Appl. No.: 97,892

[52] U.S. Cl. ..........179/1 SA

[51] Int. Cl. ..........G10l 1/16

[58] Field of Search ..........179/1 SA, 15.55, 1 VS, 1 SB; 35/35 C

[56] References Cited

UNITED STATES PATENTS 3,416,080 12/1968 Wright..........179/1 SA 3,573,612 4/1971 Scarr..........179/1 SA 3,225,141 12/1965 Dersch..........179/1 SA

*Primary Examiner*—Kathleen H. Claffy

*Assistant Examiner*—Jon Bradford Leaheey

[57] ABSTRACT

In speech recognition phenomena, each phonetic information is contained within major peaks of the sound wave. The longest time period between these major peaks has a time limit according to the lowest pitched voice, which is considered to be 45 cycles per second. Thus any longer time period that may occur between the major peaks is considered as termination point of a spoken word, and a signal is produced to operate the carriage of the typewriter. There is also provided means for preventing repetition of printing phonetic symbols during a spoken word. And further, there is provided means for allowing repetition of phonetic symbols to be typed during a spoken word, when so spoken in some languages.

4 Claims, 1 Drawing Figure

PATENTED JUN 13 1972 3,670,107
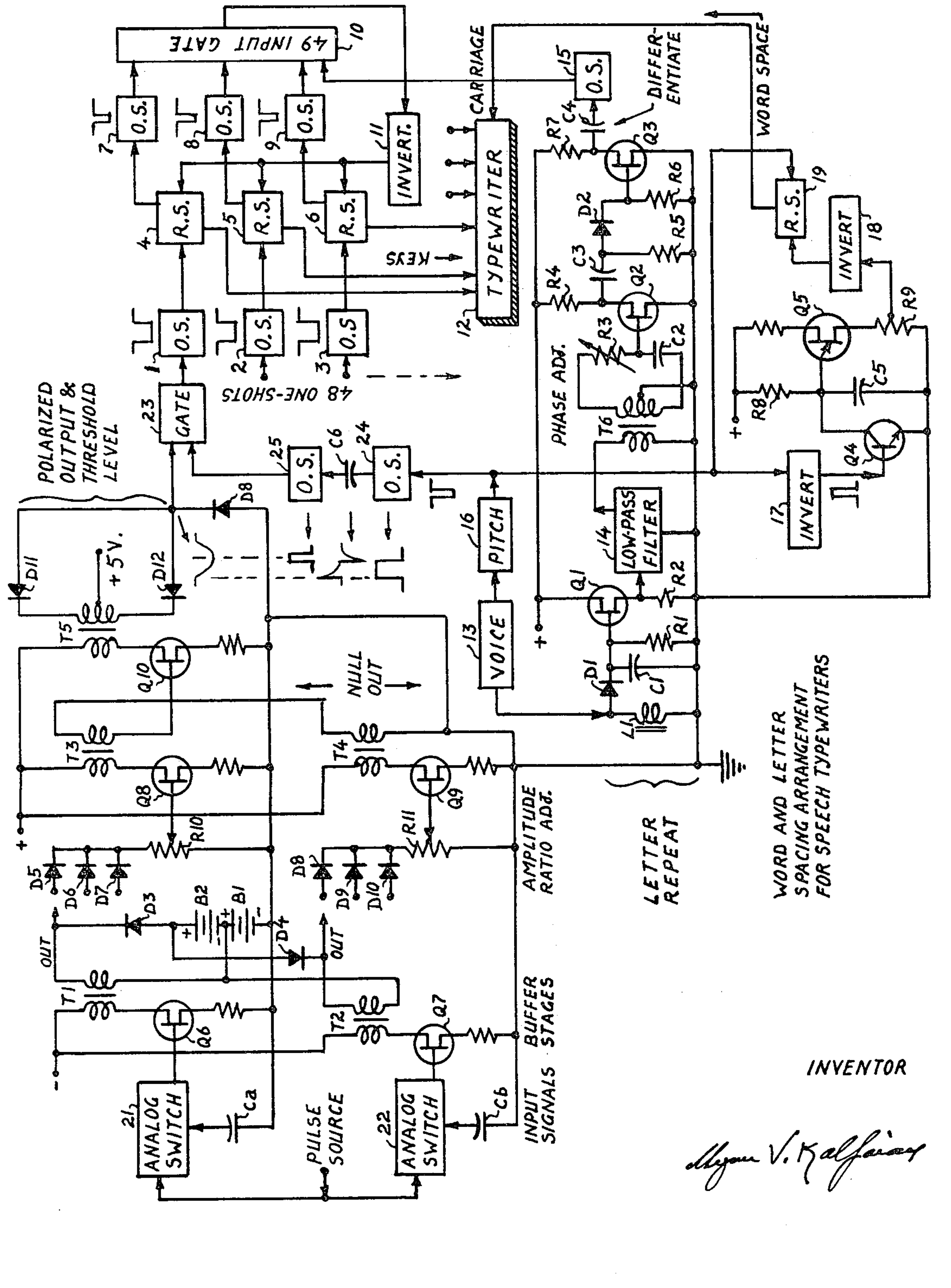
INVENTOR

WORD AND LETTER SPACING ARRANGEMENT FOR HUMAN-SPEECH TYPEWRITERS

This invention relates to phonetic speech typewriters, and more particularly to an arrangement for indicating termination points of the spoken words, so that the typed words can be separated one from another for easy reading of the typed information. The invention is also contemplated to provide means for preventing repetition of typed letters in a spoken word. And still further, the invention is contemplated to provide means for allowing repetition of typed letters within spoken words, when so spoken in some languages, such as in the Arabic or Turkish languages. For example, the letter "ä" is articulated twice in the word "saadet" which means happiness, and it is spelled with two "a's." Thus the system disclosed herein is contemplated to be useful in conjunction with speech recognizing automata for International languages.

In speech recognition phenomena, the phonetic information is contained within major peaks of the sound wave. Thus in a spoken long vowel, if the phonetic analysis is made within these major peak periods, there will occur many signal outputs representing the same phonetic sound. While delay circuits can be used to prevent repetition of the same letter to be typed until a signal representing another letter symbol arrives, the circuit arrangement as disclosed herein is contemplated to satisfy all required performances necessary for satisfactory operation of the speech typewriter. The invention will be more understandable in the following specification when read in connection with the accompanying drawing.

Assuming that the typewriter contains 48 letter symbols to represent international phonetic sounds, and that the speech analyzing device is capable of providing 48 output terminals representing these symbols to be typed, we may first couple these outputs to one-shot circuits, so that the operating output pulse lengths of these one-shots can be preadjusted suitably to any particular circuitry to be used in conjunction with. Thus the inputs of one-shots 1–3 (and to the 48th one-shot, not shown) may be considered as the outputs of an exemplary speech analyzing apparatus. The outputs of these one-shot circuits 1–3 are applied to the set inputs of set-reset flip-flops in blocks 4, 5 and 6 respectively. The set outputs of flip-flops in blocks 4, 5, and 6 are further applied to the one-shot circuits in blocks 7, 8, and 9, respectively, and the outputs of last said one-shots are applied to the 48 inputs of the gate in block 10. The output of this gate is then phase inverted in block 11, and further applied in parallel to the reset inputs of the flip-flops in blocks 4, 5, and 6. The set operating outputs of the flip-flops in blocks 4–6 are applied to the keys of the typewriter in block 12 for typing the appropriate letter symbols of the spoken phonetic sounds.

In operation, assume as an example, that a signal representing a phonetic sound arrives at the input of one-shot block 3, which in turn operates the flip-flop in block 6 to set-operating state, and that the typewriter key connected to its output has already typed a particular letter symbol. Any further signal arriving to the set input of flip-flop 6 from the one-shot in block 3 does not cause any change in operation. Now assume that the spoken phonetic sound is changed to another sound, and that the one-shot in block 1 is operated. The output pulse of this one-shot sets the flip-flop 4 into set operating state, the output of which further operates the one-shot in block 7. The output pulse of one-shot in block 7 applies a pulse to the input of gate in block 10, and the output of this gate is first phase inverted in block 11, and applied to all of the reset inputs of the flip-flops 4 to 6 (and also to the rest of the 48 flip-flops, not shown in the drawing). As illustrated above the one-shot blocks 1 to 3, and 7 to 9, the output pulses of blocks 1 to 3 are longer than the output pulses of blocks 7 to 9. Thus, when all the flip-flops 4 to 6 are operated in reset states by the short output pulse of one-shot 7, the longer output pulse of one-shot in block 1 keeps the flip-flop in block 4 in set operating state, to allow typing of the particular letter symbol that it has originally been coupled to.

Up to this point, an operating condition has been explained for the prevention of typing the same letter symbol in a spoken word. In some spoken words, however, such as in the arabic language, a phonetic sound may be repeated twice, and it is desirable that the typing agrees with the spoken sounds, which is also true in the spelling of that language, as exemplified in the foregoing. In order to provide this typing repetition function, it will be observed in the pattern of the spoken sounds that the amplitude of the repeated sound falls and rises about 10 percent of the original amplitude that would have maintained without repetition. Then again, the repetition rate of these spoken phonetic sounds does not exceed 25 cycles per second, but it varies in the speech of different speakers. Thus we may use a low frequency pass-band filter to detect amplitude variations at lower frequencies than the lowest pitch frequency that may occur in any base-voice speaker, and release the flip-flops in blocks 4 to 6 from their set operating states, so that the same letter symbol that had already been typed may be repeated, when so spoken. The low-pass filter will also pass the amplitude variation frequencies that occur at the transient points between succeeding phonetic sounds. But this will not interfere with proper letter spacings, because release of the flip-flops in blocks 4 to 6 from set to reset states does not cause any typing, or carriage shifting. Then again, at the transient points between phonetic sounds the phonetic information is not clear, and no typing occurs at these points. A phase shifter after the pass-band filter 14, however, will further add to the accuracy of timing control with respect to the control pulses arriving from the one-shots 7 to 9. Accordingly, the circuit arrangement, as shown in the accompanying drawing, and described below, is one example that will satisfy the desired performance, for either self-locking each symbol to be typed, or releasing the lock for repeating the same symbol to be typed twice in a spoken word.

Referring again to the circuit arrangement, the voice sound from th wave across coil L1, arriving from block 13 is rectified by diode D1, and smoothed out across parallel connected capacitor C1 and resistor R1, and applied to the gate electrode of transistor Q1. The output of Q1 is taken from its source circuit resistor R2, and applied to the low-pass filter in block 14. The output of filter 14 is further applied to transformer T1, and across its secondary is connected a phase shifting network comprising series connected capacitor C2 and resistor R3. This phase shifted wave is amplified by transistor Q2, and the amplified wave across resistor R4 is coupled to a rectifying diode D2 through coupling capacitor C3 and load resistor R5, and the rectified output across R6 is further amplified by transistor Q3, so that the rectified wave across output resistor R7 is finally differentiated by coupling capacitor C4 and applied to the one-shot in block 15. The output pulse of one-shot 15 is finally applied to the 49th input of gate in block 10, for the required reset operation of the flip-flops in blocks 4 to 6, as described in the paragraph supra.

As described in the foregoing, word separation is achieved by measuring the time intervals between succeeding major peaks of the speech sound waves, and interpret those intervals exceeding a predetermined time limit, as separation points between the spoken words. For such operation, an exemplary arrangement is shown in the drawing, wherein, the voice in block 13 is first applied to a pitch selector in block 16, which produces pulse signals at pitch periods. These pitch pulses are applied to a phase inverter in block 17, and further applied to the base electrode of a normally idle discharger transistor Q4, which is connected in parallel across the capacitor C5. The time constant of series connected capacitor C5 and resistor R8 is adjusted to be longer than the longest time period that occurs between major peaks in the lowest pitched base voices. The junction terminal of R8 and C5 is connected to the emitter electrode of a unijunction transistor Q5, which operates as a pulse generating oscillator by discharging the capacitor C5 in pulses periodically at the rising points of critical voltage levels. The positive pulse outputs of unijunction transistor Q5 is taken from R9, phase inverted in block 18, and applied to the set input of the set-reset flip-flop in block 19, which operates in set state and drives the one-shot in block 20 for a final pulse application to the typewriter carriage in block 12 for the required word spacing. It will be noted that the discharger transistor Q4 is included to discharge the capacitor C5 by the pitch pulses arriving from the pitch selector in block 16. This will prevent operation of the junction transistor Q5 until a pitch period is long enough for the capacitor C5 to charge to the critical voltage level for firing the Q5. It will also be noted that during a long pose of the arriving pitch pulses, the unijunction transistor Q5 will oscillate and cause continuous movement of the typewriter carriage. For this reason, the set-reset flip-flop in block 19 is included, which operates only once in set operating state until a pitch pulse is applied to its reset input, as shown.

By the exemplary arrangements given in the drawing, it has been explained how typewritten words on a speech typewriter can be closely controlled to approximate the resemblance of hand typed words for easy reading. As explained in the foregoing, however, the present disclosure is not restricted for the purpose of typing spoken words, and its uses may vary widely in the modern technology of electronics. But since the ultimate model of a speech typewriter is still in the experimental stage, I have contemplated to use the arrangement shown herein in conjunction with the speech typewriter system disclosed in my U.S. patent application Ser. No. 828,067 filed Apr. 29, 1969, now U.S. Pat. No. 3,622,706 issued Nov. 23, 1971, which I have described as a basic system for an ultimate model of a human-speech typewriter. Accordingly, the arrangements shown herein are contemplated to be detailed additions and improvements of the system disclosed in that patent application. For example, in one of its phases, the final output signals which are produced to drive the keys of a typewriter are derived from amplitude ratio matchings between various combinations of stored signals from the subbands of the original sound waves. In order to eliminate as much critical circuitry in the entire system of the speech typewriter, however, I have included the same amplitude ratio matching circuitry (such as shown in FIG. 14 and fully described in that application, now patented as mentioned) in modified form in conjunction with the drawing of the present disclosure. Thus as an exemplary output of the speech analyzer applied to the input of one-shot in block 1, and referring to the drawing given herein, the capacitors Ca and Cb represent the output elements in which are stored the rectified signals of two different sub-bands of the speech sound wave. The stored voltage across Ca is applied to the gate electrode of buffer stage transistor Q6 in series with the analog switch in block 21, and the stored voltage across Cb is applied to the gate electrode of buffer stage transistor Q7 in series with the analog switch in block 22. These analog switches are operated simultaneously by about 0.2 millisecond long pulses labeled as "PULSE SOURCE" (refer to the specification and the pulse distributor block 193 in FIG. 15 of the reference patent), and cause proportional currents through the primaries of transformers T1 and T2, respectively. One of the terminals of the secondaries of T1 and T2 are connected to ground in series with the bias source B1, and the other terminals are labeled as (OUT) representing the output terminals. The secondaries of T1 and T2 are also shunted by diodes D3 and D4, respectively, in series with the bias source B2. These diodes are used to prevent oscillation in the secondaries, and the voltage levels of bias sources B1 and B2 are adjusted equal to the conducting threshold gaps of the diodes, so that the diodes will start conducting from close to zero voltage level across the secondaries of T1 and T2.

The output of the secondary of T1 is connected to ground in series with one of the signal-mixing diodes D5 through D7, and resistor R10, and the output of the secondary of T2 is connected to ground in series with one of the signal-mixing diodes D8 through D10, and resistor R11. For each specific phonetic information of the original speech sound, the voltage gains across R10 and R11 are preadjusted, and applied to the gate electrodes of transistors Q8 and Q9, respectively. The resultant effect is that, the oppositely polarized voltages across secondaries of T3 and T4 will either nullify to zero voltage for a specific gain ratio adjustments across R10 and R11, or above zero voltage (positive or negative, depending on which of the two voltages is greater) when the incoming information is other than said gain adjustments had originally been intended for. Finally, the outputs of series connected secondaries of T3 and T4 are applied to the gate electrode of amplifier transistor Q10, and the secondary of T5 is full-wave rectified by the diodes D11, D12, for application in "0" level to one of the inputs of the gate in block 23. The other input of this gate is normally biased to "0" level, so that the output of gate 23 will not operate the one-shot in block 1, until both inputs of gate 23 are at "1" levels. Thus when a pitch pulse from block 16 operates the one-shot in block 24, it delays the pulse slightly and further operates the one-shot in block 25 through the differentiating coupling capacitor C6. The output pulse of one-shot 25 is finally applied to one of the inputs of gate in block 23 in "1" level. If at this time the other input has not received "0" level voltage from the secondary of T5, and has remained at "1" level, the gate 23 operates the one-shot in block 1 for the required typing of a letter symbol. On the other hand, if the gate 23 has received "0" level signal from T5, it remains inoperative by the arriving pulse from one-shot in block 25. The diode 13 is used to prevent excessive reverse voltage applied to the gate 23.

With the examples given in the drawing, it is seen that many modifications, adaptations, and substitutions of parts are possible within the scope of the invention, and the invention is therefore is limited only by the claims embracing these possibilities.

What I claim is:

1. In a speech analyzing system having a plurality of outputs representing the phonetic sounds of spoken words, the signal from an output may repeat more than once during an articulated phonetic sound, a system for preventing such repetition comprising a first plurality of one-shots; coupling means from the said plurality of outputs to the inputs of said first plurality of one-shots; a plurality of set-reset flip-flops, each one having a set and reset input; coupling means from the outputs of said first plurality of one-shots to said set inputs of said plurality of flip-flops; a second plurality of one-shots having shorter operating output pulses than the output pulses of said first plurality of one-shots; coupling means from the set operating outputs of said plurality of flip-flops to the inputs of said second plurality of one-shots; means for mixing the output pulses of said second plurality of one-shots, and means for feeding back the mixed pulses in parallel to the reset inputs of said plurality of flip-flops thereby resetting all of said plurality of flip-flops except the flip-flop that has last operated in the set state since its input pulse is longer than said feedback reset pulse and means for utilizing the set outputs of said plurality of flip-flops as representing phonetic sounds.

2. The system as set forth in claim 1, wherein is included means for allowing repetition of the signal at said outputs when so articulated in a spoken word comprising means for deriving pulse signals from the amplitude modulations of the original sound wave that occur when a phonetic sound is articulated successively in a spoken word; and means for mixing said derived pulse signals with said mixed pulses obtained from said means for mixing the output pulses of said second plurality of one-shots, whereby effecting the reset operating state of any of said plurality of flip-flops that has been in the set state, for passing a repetition signal of a phonetic sound in a spoken word.

3. The system as set forth in claim 1, wherein is included means for producing pulse signals representing termination points of spoken words, which comprises means for selecting the major peaks of the spoken sound wave in the analyzing system; means for measuring successively the time intervals between the selected peaks; means for selecting those measured time intervals between the selected peaks exceeding the time interval of the longest time interval that occurs between major peaks in normal speech; and means for producing operational pulses at terminations of said longest time intervals, as representations of the terminating points of said spoken words.

4. The apparatus in the system as set forth in claim 1, wherein is included means for producing pulse signals representing termination points of spoken words, comprising means for producing pulse signals at the pitch frequencies of the speech sound waves in said analyzing system; an electron discharge device having a control electrode capable of triggering said device into electrical conduction when a voltage above a specified level is applied to it; a resistance-capacitance network having a time constant longer than the longest time interval occurring between the pulse signals at said pitch frequencies, and connected to a voltage source for producing a rising voltage in said capacitor at the rate of said time constant; coupling means of said rising voltage to the control electrode of said electron discharge device, for triggering discharge of said risen voltage at the reach of said specified voltage level by said conduction; means for deriving an auxiliary pulse signal from said conduction; a normally idle electron discharge device connected in parallel across said capacitor, last said device having a control electrode; coupling means of said pulse signals at said pitch frequencies to the control electrode of said normally idle electron discharge device, for discharging the rising voltage across said capacitor, and thereby preventing said conduction during the period within which last said pulse signals are being produced; an auxiliary set-reset flip-flop; coupling means from said auxiliary pulse signal to the set input of auxiliary set-reset flip-flop; means for utilizing the set output of last said flip-flop as representative of said termination point of said spoken word; and coupling means from the pulse signals at said pitch frequencies to the reset input of last said flip-flop for cyclic operation.

* * * * *